Patented Dec. 14, 1943

2,336,464

UNITED STATES PATENT OFFICE 2,336,464

UREA AND THIOUREA DERIVATIVES

Johannes S. Buck, Bronxville, and Edwin J. de Beer, Yonkers, N. Y., assignors to Burroughs Wellcome & Co. (U. S. A.) Inc., New York, N. Y., a corporation of New York No Drawing. Application July 18, 1941,
Serial No. 402,940

4 Claims. (Cl. 260—553)

This invention relates to urea and thiourea derivatives and particularly to products of the above type having sedative, hypnotic or anesthetic properties, generally herein referred to as hypnotics.

An object of the invention is to obtain novel urea and thiourea derivatives.

Another object is to provide a novel and improved hypnotic.

Another object is to provide a hypnotic having novel and improved characteristics.

Other objects and advantages will be apparent as the nature of the invention is more fully disclosed.

Although the novel features which are believed to be characteristic of this invention will be pointed out more particularly in the claims appended hereto, the invention will be better understood by referring to the following description in which a specific embodiment thereof has been set forth for purposes of illustration.

In accordance with the present invention we have found that substituted ureas and thioureas containing a single halogenated aromatic ring and containing no long chain substituents possess valuable hypnotic properties and are suitable for use as anesthetics.

Such ureas and thioureas may be represented by the following formula:

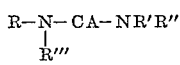

in which R represents an alkyl radical having less than 8 carbon atoms, A represents O or S, R' and R'' each represent hydrogen or alkyl radicals having less than 8 carbon atoms and which may or may not be the same radical, and R''' represents a haloaryl or haloaralkyl radical such as a halogenated phenyl, benzyl or phenethyl radical which radical may be further substituted by one or more alkyl, or alkoxy radicals of less than 8 carbon atoms each. R and R''' together must contain at least 8 carbon atoms.

In the case of a phenyl radical the ring is directly bound to the N. In the case of the benzyl and phenethyl radicals the ring is aliphatically bound to the N by —CH₂— and —CH₂CH₂— respectively. The term "halogenated" refers to a radical substituted one or more times by a halogen.

The following specific examples of such ureas and thioureas are given only as illustrative of the general class embodied within the above formula:

N-ethyl-N-(2-chlorophenyl) urea
N-ethyl-N-(3-chloro-2-methylphenyl) urea
N-ethyl-N-(3-chloro-2-methylphenyl) thiourea
N-n-butyl-N-(4-bromo-2-methylphenyl) urea
N-methyl-N-(2-bromo-4-ethylphenyl) urea
N-ethyl-N-(4-bromo-2-ethylphenyl) urea
N-ethyl-N-(4-bromo-2-ethylphenyl) thiourea
N-ethyl-N-(3-bromo-6-ethoxyphenyl) urea
N-n-propyl-N-(4-bromo-2-methylphenyl) urea
N-ethyl-N-(4-chloro-2-methylphenyl) thiourea
N-methyl-N-(2-bromo-5-ethoxybenzyl) urea
N-methyl-N-(3-bromo-4-methoxybenzyl) urea
N-methyl-N-(3-chloro-4-ethoxybenzyl) thiourea
N-methyl-N-(2- bromo - 5 - methoxyphenethyl) - urea
N-methyl-N-(3- chloro - 4 - methoxyphenethyl) - urea
N-ethyl-N-(3-bromo-4-ethoxyphenethyl) urea
N-methyl-N-(4-bromophenyl)-N'-allylthiourea Specific examples of methods of making representative substances are as follows:

Example 1

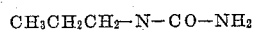
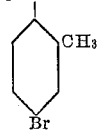

N-n-propyl-N-(4-bromo-2-methylphenyl) urea may be made as follows—

The base liberated from 13.3 grams n-propyl-4-bromo-2-methylaniline hydrochloride, is dissolved in 50 cc. 95 per cent ethyl alcohol and 5 grams nitrourea added. After warming on the water bath for one hour, the solution is further treated with 3 grams nitrourea, and finally, with a further 2 grams nitrourea. After boiling off the alcohol, water is added, the product extracted with ether, and the extract dried with anhydrous potassium carbonate and the ether evaporated. The residue is dissolved in hexane. On long standing in a refrigerator, crystals are obtained. These are recrystallized from hexane until pure.

The compound forms white or colorless needle prisms melting at about 95° C.

Example 2

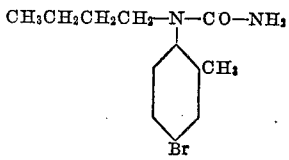

N-n-butyl-N-(4-bromo-2-methylphenyl)urea may be made as follows—

4-bromo-2-methylaniline is converted, by means of n-butyltoluenesulfonate, into n-butyl-4-bromo-2-methylaniline. This base is then converted into the above urea by means of nitrourea. The compound could not be crystallized so, after partitioning, washing, and drying, it was distilled in a molecular still, the fraction boiling at about 105° C.–130° C. (temperature of air bath) at 0.001 mm. pressure being collected.

Example 3

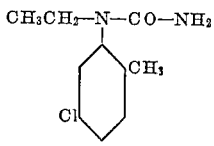

N-ethyl-N-(5-chloro-2-methylphenyl)urea may be made as follows—

Ethyl-5-chloro-2-methylaniline is reacted with nitrourea in alcohol, in the customary manner. The solution is again treated with nitrourea and heated. After evaporating the alcohol, the residue is steam-distilled. The residue in the flask solidifies on cooling. After filtering off, the solid is washed with water, ground with cold ether, and recrystallized several times from aqueous alcohol. The compound forms felted needles or prisms melting at about 167° C.

Example 4

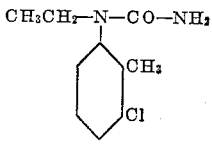

N-ethyl-N-(3-chloro-2-methylphenyl)urea is prepared substantially as in Example 3, from ethyl-3-chloro-2-methyl-aniline and nitrourea. The compound forms large irregular prisms, melting at about 94° C. when recrystallized from hexane.

Example 5

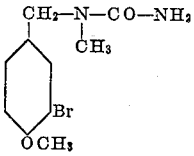

N-methyl-N-(3-bromo-4-methoxybenzyl)urea may be prepared by reacting 3-bromo-4-methoxybenzylmethylamine with nitrourea. After recrystallizing the product from 95 per cent alcohol it forms glossy leaflets, melting at about 178° C.

Example 6

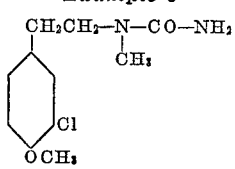

N-methyl-N-(3-chloro-4-methoxyphenethyl) urea 3-chloro-4-methoxyphenethylmethylamine is obtained by chlorination of methylhomoanisylamine, and is reacted with nitrourea in aqueous alcohol, in the usual manner. The compound, recrystallized from ethyl acetate, forms crystals melting about 118° C.

Example 7

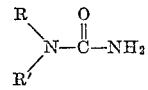

N-ethyl-N-(3-bromo-6-ethoxyphenyl) urea

Acet-o-phenetidine is brominated in acetic acid solution and the product, after purification by recrystallization, is hydrolyzed by a mixture of alcohol and hydrochloric acid. The base, liberated from the hydrochloride, is then N-ethylated by means of diethyl sulfate, and the resulting crude ethyl-3-bromo-6-ethoxyaniline purified via the nitroso compound in the customary manner. The amine so obtained is reacted with nitrourea in 95% alcohol solution. After the reaction is over the alcohol is evaporated, water and salt are added and the mixture steam distilled. The residue, which solidifies on cooling, is recrystallized from suitable solvents, for example, ethyl acetate-hexane mixture, until pure, when it forms white needles, melting at about 124° C.–125° C.

The foregoing examples are not to be taken as in any way delimiting the invention, but are merely illustrative of the methods involved. The invention is to be limited only by the scope of the following claims.

What we claim is:

1. A substituted urea containing a single halogenated aromatic ring and no long chain groups, and represented by the formula $$\begin{array}{c} R \\ \diagdown \\ R' \end{array} N - \overset{O}{\underset{\|}{C}} - NH_2$$

in which R represents an alkyl radical having from 2 to 4 carbon atoms; and R' represents a member of the group consisting of a halogenated phenyl radical, a halogenated phenyl radical substituted on the nucleus at least once by an alkyl radical of less than eight carbon atoms, and a halogenated phenyl radical substituted on the nucleus at least once by an alkoxy radical of less than eight carbon atoms.

2. N-n-propyl-N-(4-bromo-2-methylphenyl)-urea.

3. N-ethyl-N-(5-chloro-2-methylphenyl)urea.

4. N-n-butyl-N-(4-bromo-2-methylphenyl)-urea.

JOHANNES S. BUCK.
EDWIN J. DE BEER.